United States Patent
Nadel et al.

(10) Patent No.: US 8,005,860 B1
(45) Date of Patent: *Aug. 23, 2011

(54) OBJECT-LEVEL DATABASE PERFORMANCE MANAGEMENT

(75) Inventors: Gil Nadel, Tel Aviv (IL); Kristiaan Kolk, Garderen (NL)

(73) Assignee: Precise Software Solutions, Inc., Redwood Shores, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 12/475,293

(22) Filed: May 29, 2009

Related U.S. Application Data

(63) Continuation of application No. 10/750,346, filed on Dec. 31, 2003, now Pat. No. 7,562,094.

(51) Int. Cl.
*G06F 17/30* (2006.01)
(52) U.S. Cl. .................... 707/781; 707/791; 707/802
(58) Field of Classification Search ............... 707/781
See application file for complete search history.

(56) References Cited

U.S. PATENT DOCUMENTS

| | | | | |
|---|---|---|---|---|
| 5,881,379 A * | 3/1999 | Beier et al. | ............ | 1/1 |
| 6,192,377 B1 * | 2/2001 | Ganesh et al. | ............ | 1/1 |
| 2002/0055964 A1 * | 5/2002 | Luk et al. | ............ | 709/107 |
| 2003/0182276 A1 * | 9/2003 | Bossman et al. | ............ | 707/3 |
| 2004/0030782 A1 * | 2/2004 | Nakahara | ............ | 709/226 |
| 2004/0133591 A1 * | 7/2004 | Holenstein et al. | ............ | 707/102 |
| 2004/0172636 A1 * | 9/2004 | Do et al. | ............ | 719/321 |
| 2005/0076154 A1 * | 4/2005 | Chambliss et al. | ............ | 710/1 |
| 2005/0086242 A1 * | 4/2005 | Ngai et al. | ............ | 707/100 |

* cited by examiner

*Primary Examiner* — Don Wong
*Assistant Examiner* — Binh V Ho
(74) *Attorney, Agent, or Firm* — Swernofsky Law Group PC

(57) ABSTRACT

A method and system are provided for object-level database monitoring and tuning in a performance management system. Performance data for a plurality of database objects in a database server computer system are collected and stored. A performance problem in the database server computer system is detected. A problematic database object is identified using the performance data for the plurality of database objects, wherein the problematic database object is related to the performance problem. The problematic database object is tuned to improve performance of the database server computer system.

16 Claims, 4 Drawing Sheets

OBJECT-LEVEL DATABASE PERFORMANCE MANAGEMENT

BACKGROUND OF THE INVENTION

1. Field of the Invention

This invention is related to the field of application performance management and, more particularly, to the monitoring and tuning of database object performance.

2. Description of the Related Art

In the information technology (IT) departments of modern organizations, one of the biggest challenges is meeting the increasingly demanding service levels required by users. With more and more applications directly accessible to customers via automated interfaces such as the world wide web, "normal" business hours for many enterprises are now 24 hours a day, 7 days a week. The need for continuous availability and performance of applications has created complex, tiered IT infrastructures which often include web servers, middleware, networking, database, and storage components. These components may be from different vendors and may reside on different computing platforms. A problem with any of these components can impact the performance of applications throughout the enterprise.

The performance of key applications is a function of how well the infrastructure components work in concert with each other to deliver services. With the growing complexity of heterogeneous IT environments, however, the source of performance problems is often unclear. Consequently, application performance problems can be difficult to detect and correct. Furthermore, tracking application performance manually can be an expensive and labor-intensive task. Therefore, it is usually desirable that application performance management tasks be automated.

Automated tools for application performance management may assist in providing a consistently high level of performance and availability. These automated tools may result in lower costs per transaction while maximizing and leveraging the resources that have already been spent on the application delivery infrastructure. Automated tools for application performance management may give finer control of applications to IT departments. Application performance management tools may enable IT departments to be proactive and fix application performance issues before the issues affect users. Historical performance data collected by these tools can be used for reports, trending analyses, and capacity planning. By correlating this collected information across application tiers, application performance management tools may provide actionable advice to help IT departments solve current and potential problems.

In a real-world environment, the performance of applications may be highly variable due to normal variations in resource usage over time. Furthermore, requirements such as user needs, usage patterns, customization requirements, system components, architectures, and platform environments may vary from business unit to business unit. These variations may also cause application performance to be highly variable. Tuning applications to work together efficiently and effectively in their unique environments can be crucial to reaching organizational goals and maintaining competitive advantages. Automated tools for application performance management can assist in these tuning operations.

The database management system (DBMS) is one category of application where performance management can be critical. In previous approaches towards database performance management, queries (e.g., SQL statements) and entire database instances could be monitored and tuned to maintain or improve their performance. It is desirable to provide performance management of additional elements within database management systems.

SUMMARY OF THE INVENTION

Various embodiments of a system and method described herein may provide object-level database monitoring and tuning in a performance management system. In one embodiment, a method of performance management for database server computer systems comprises collecting and storing performance data for a plurality of database objects. The method may further comprise detecting a performance problem in the database server computer system. A problematic database object may be identified using the performance data for the plurality of database objects, wherein the problematic database object is related to the performance problem. The problematic database object may be tuned to improve performance of the database server computer system.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

A performance management system may include one or more software programs for application performance management. By continuously monitoring key components and/or applications of computer systems, the performance management system may act to detect and correct performance problems among applications and other system components in a complex computing environment. The performance management system may provide performance management in a variety of stages, such as: identification of symptoms that could indicate a performance problem, identification of sources or locations of problems, discovery of root causes of problems, recommendation of measures to address the root causes and improve performance, and verification that the measures have achieved desired goals. By defining baselines for "normal" application behavior, the performance management system may automatically detect degradation based on those established norms.

In one embodiment, the performance management system may be implemented in a variety of versions, each of which is customized for management of a particular class of target software: e.g., various products from PeopleSoft, Inc.; Oracle® database management software and related applications; web-based applications; SAP®; various products from Siebel Systems, Inc.; ClarifyCRM™; J2EE™; and other suitable targets. Furthermore, each of the versions may be implemented on one or more computing platforms (e.g., Solaris running on Sun Microsystems™ hardware, or a Microsoft Windows® OS running on Intel-based hardware). As used herein, the term "performance management system" is intended to include all of these disparate, customized software programs.

Figure 1:
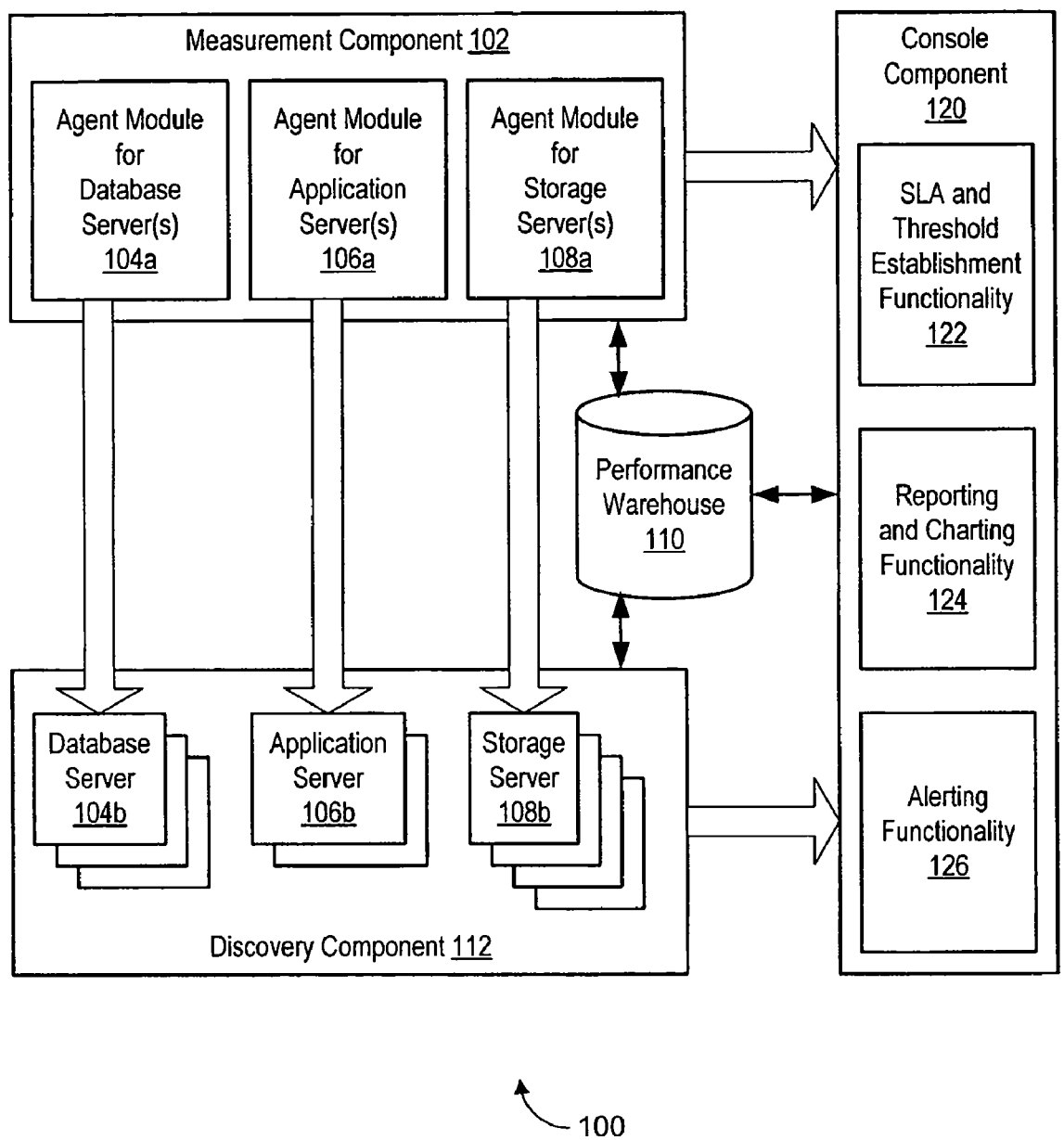
FIG. 1 illustrates an exemplary performance management system in which embodiments of a system and method for performance management may be implemented.
Figure 2:
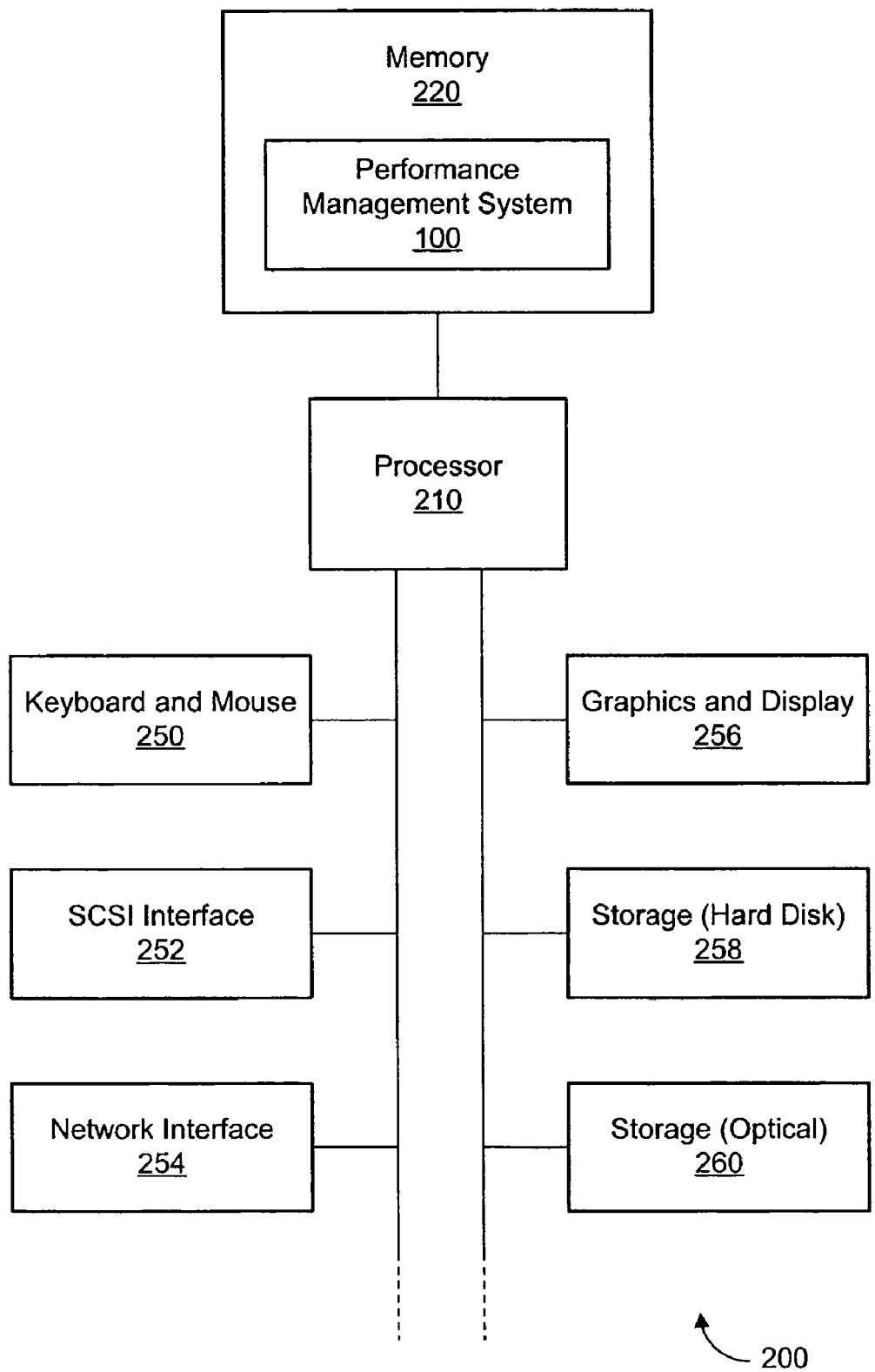
FIG. 2 illustrates components of an exemplary computer system with which embodiments of a system and method for performance management may be implemented.

FIG. 1 is an architecture diagram of a performance management system 100 in an exemplary configuration. As illustrated in FIG. 1, the performance management system 100 may include components such as a measurement component 102 (including various agent modules 104a, 106a, and 108a), a discovery component 112, a console component 120, and a performance warehouse 110. The various components of the performance management system 100 may reside on the same computer system, on different computer systems, or on an arbitrary combination of computer systems. An exemplary computer system is illustrated in FIG. 2.

In one embodiment, the measurement component 102 uses agent software to capture performance metrics on servers running target applications. The measurement component 102 may provide a "breadth-wise" view of performance across multiple technology tiers (e.g., web clients, web servers, networks, application servers, database servers, storage servers, etc.). The measurement component 102 may measure, for example, end-to-end response times from the viewpoint of a user. The measurement component 102 may measure segmented response times from tier to tier and may therefore indicate the location of performance problems in a particular tier.

In one embodiment, a "base" version of the measurement component 102 may provide monitoring of a limited set of targets (e.g., TCP/IP-based applications). The functionality of the measurement component 102 may be augmented with optional agent modules that are customized to gather and analyze data for particular targets (e.g., web clients, web servers, networks, application servers, database servers, storage servers, etc.). For purposes of illustration and example, three agent modules 104a, 106a, and 108a are shown. Other combinations of agent modules may be used in other configurations.

In one embodiment, the discovery component 112 provides identification and resolution of root causes of performance degradation. By permitting a user to "drill down" through various tiers of hardware and software (e.g., individual servers), the discovery component 112 may provide a "depth-wise" view of performance within each of the tiers that a target application crosses. The discovery component 112 may further indicate steps to be taken to fix current problems or avoid future problems.

In FIG. 1, each of the server blocks 104b, 106b, and 108b within the discovery component 112 are intended to represent installations of agent software on the respective servers. For example, the three database server blocks 104b represent three agent software modules associated with three respective database server installations. Likewise, the two application server blocks 106b represent two agent software modules associated with three respective application server installations, and the four storage server blocks 108b represent four agent software modules associated with four respective storage server installations. The combination of servers 104b, 106b, and 108b is provided for purposes of illustration and example and is not intended to be limiting.

In one embodiment, the console component 120 includes a "watchdog" layer that communicates key performance indicators, such as exceptions to service level agreements (SLAs), to appropriate users at appropriate times. The console component 120 may include functionality 122 for establishing SLAs and other thresholds. The console component 120 may include functionality 124 for reporting and charting. The console component 120 may include functionality 126 for providing alerts. Therefore, the console component 120 may function as a management console for user interaction with the measurement component 102 and discovery component 112.

In one embodiment, the performance warehouse 110 includes a repository of performance metrics which are accessible to the other components in the performance management system 100. For example, the historical data in the performance warehouse 110 may be used by the other components to provide short- and long-term analysis in varying degrees of detail.

The performance management system 100 of FIG. 1 may be executed by one or more networked computer systems. FIG. 2 is an exemplary block diagram of such a computer system 200. The computer system 200 includes a processor 210 and a memory 220 coupled together by communications bus 205. The processor 210 can be a single processor or a number of individual processors working together. The memory 220 is typically random access memory (RAM), or some other dynamic storage device, and is capable of storing instructions to be executed by the processor 210. For example, the instructions may include instructions for the performance management system 100. The memory 220 may store temporary variables or other intermediate information during the execution of instructions by the processor 210. The memory 220 may store operating system (OS) software to be executed by the processor 210.

In various configurations, the computer system 200 may include devices and components such as a keyboard & mouse 250, a SCSI interface 252, a network interface 254, a graphics & display device 256, a hard disk 258, and/or a CD-ROM 260, all of which are coupled to the processor 210 by a communications bus 207. The network interface 254 may provide a communications link to one or more other computer systems via a LAN (local area network), WAN (wide area network), internet, intranet, or other appropriate networks. It will be apparent to those having ordinary skill in the art that the computer system 200 can also include numerous elements not shown in the figure, such as additional storage devices, communications devices, input devices, and output devices, as illustrated by the ellipsis.

Object-level performance management represents a methodology for database application tuning, techniques, and technology that differs from the common practice (e.g., database-level performance management or statement-level performance management). A methodology for object-level performance management is important because of the advancements in modern relational database management systems, where automatic tuning takes place using components such as "SQL Optimizer." Typically, this automatic tuning leaves very little space for application developers to tune applications by modifying SQL statements or for DBAs to tune a database instance by modifying parameters. In effect, modern database management systems leave only one form of decision with the DBA, and that is to define the organization of data inside the application objects. In contrast to existing methodologies, the object-level performance management methodology described herein concentrates on the effect of accessing database objects in queries on the performance of these queries, instead of looking at the amounts of access requests.

Figure 3:
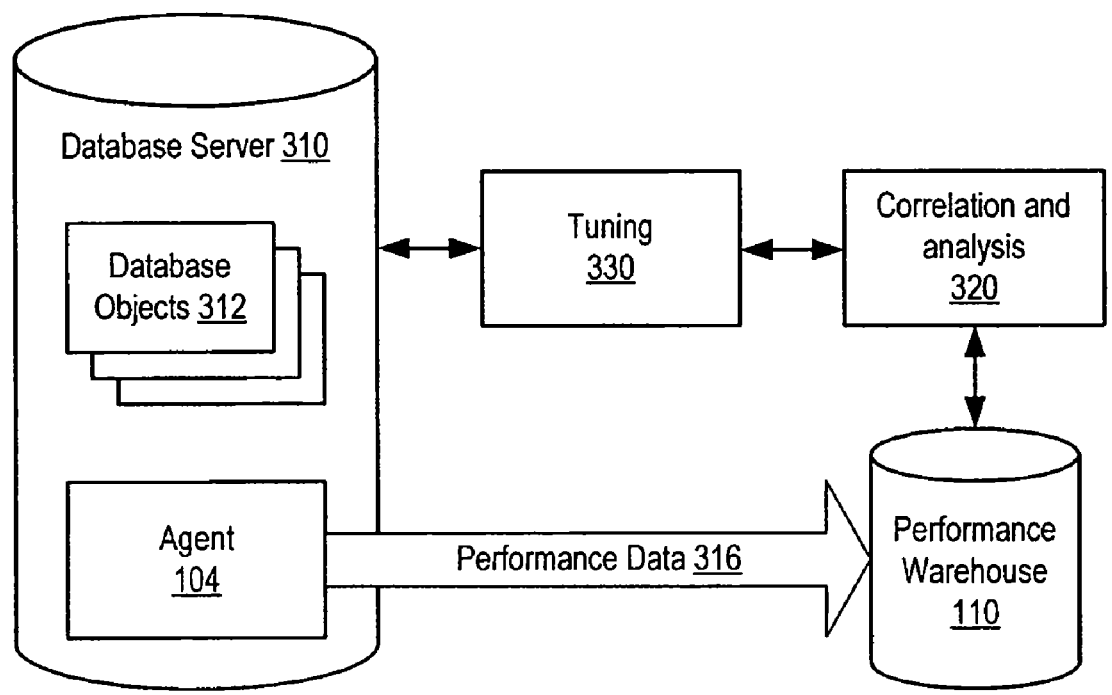
FIG. 3 illustrates components of an object-level database performance management system according to one embodiment.

FIG. 3 illustrates components of a performance management system for database objects according to one embodiment. A database server 310 may provide organized storage and retrieval of large amounts of data. As used herein, the term "database server" is synonymous with "database server computer system" and "database management system." In one embodiment, the database server 310 may comprise a relational database server. In one embodiment, the database server 310 may comprise Oracle® database management software or other suitable database management software. The database server 310 The database server 310 may be implemented using a computer system 200 as illustrated in FIG. 2.

The database server 310 may include one or more database objects 312. Database objects 312 may comprise tables, indices, and other aggregations of data. These objects may participate in the execution of SQL statements, which are the building blocks of database applications. Objects may participate in more than one SQL statement. They may be accessed in parallel by several SQL statements, identical or different. The object might be accessed in various access patterns. All of the above factors may affect the performance of the SQL statements, and hence also the performance of the application.

In one embodiment, the object-level performance management methodology focuses on measuring the time that is needed to access these objects, and how this time affects the performance of the SQL statement itself. The methodology also looks at the participation of objects in SQL statements, the resource required to access the objects, the access patterns, and the resource contention that occurs.

In contrast with other tuning methodologies, the methodology described herein does not consider the amount of access requests as important. For example, it does not matter how many blocks are being read from disk in order to access a certain table, or even how many read operations are being made; what matters is that the SQL statement was waiting for the read operation to finish, and the only important measurement needed is the amount of time the SQL statement waited (i.e., the I/O wait for the object). Likewise, even if no I/O is involved in accessing the table, e.g., because it is buffered in memory, the methodology should consider the time (CPU time) that is needed to traverse the table's blocks in the buffer, not the number of blocks needed.

In one embodiment, the access time measurement, either I/O wait or CPU time, is more important than the amount of I/O operations or blocks visited (logical I/O). The reason is that the size of the object, or even its structure, does not immediately indicate the time needed to perform these actions. As an example, the same table could cause different I/O wait on the SQL statement, depending on whether it is deployed on slow disks or fast disks. More than that, the CPU time required to access a small number of columns of rows in the table is less than the CPU time required to access all columns.

The technology required for following the above methodology is not readily available in any commercially available database management system. However, it can be made available by sampling the activity of the application within the database, and identifying the objects involved in active SQL statements, during every sample.

As discussed with reference to FIG. 1, an agent 104 is operable to monitor the database server 310. In one embodiment, the agent 104 may sample the database objects 312 for various resource consumption cases (e.g., I/O waits, application lock waits, and other types of contention). The agent 104 may collect and store the database-related performance data 316 in the performance warehouse 110. The database-related performance data 316 may be used for correlation with particular database objects 312 and analysis of root causes of performance problems. The correlation and analysis 320 may further be used for tuning 330 of the database server 310, including tuning of specific database objects 312.

Figure 4:
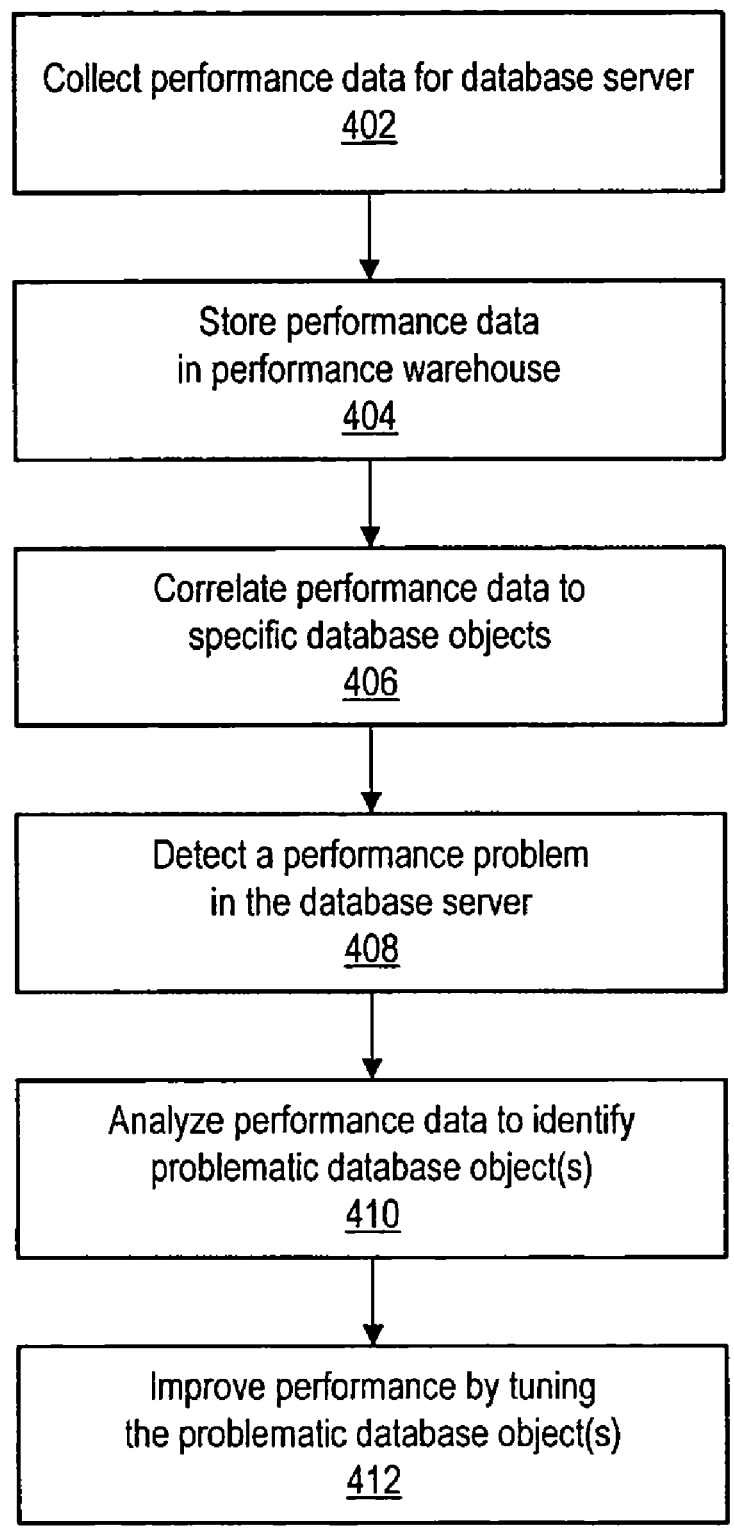
FIG. 4 is a flowchart which illustrates a method of object-level database performance management according to one embodiment.

FIG. 4 is a flowchart which illustrates a method of object-level database performance management according to one embodiment. Performance data 316 for the database server 310 is collected in 402. The performance data 316 may be collected on a routine and automatic basis by the agent 104. The performance data 316 may include occurrences of I/O waits, application lock waits, and other types of contention. In 404 the performance data 316 is stored in a performance warehouse 110.

The performance data 316 is correlated to specific database objects in 406. The correlations may be stored in the performance warehouse 110. As will be described below, various techniques may be used to generate the correlations. Although the examples below are described with reference to Oracle® database servers, similar techniques for other database servers will be apparent to those skilled in the database management arts.

In one embodiment using an Oracle® database server, it is possible to sample which objects are involved in lock contention and other types of contention (e.g., in the v$session dynamic performance view). The column ROW_WAIT_OBJ# holds the information about the object identifier that is currently contended for. By sampling that column for all the sessions in v$session periodically, one can identify which objects appear in contention situations more than others, and one can therefore deduce that these objects have larger contention wait times than others.

In one embodiment using an Oracle® database server (e.g., version 8 or 8i or 9i), it is possible to sample which blocks are involved in I/O operations (e.g., in the v$session_wait dynamic performance view). By sampling this table and focusing only on rows that describe I/O events (where the value of the column EVENT is some I/O event, e.g., "db file scattered read"), one can keep a list of relative data block addresses (RDBA) for later analysis. The RDBA is typically kept in the columns P1 and P2 for most I/O events, where P1 is the relative file number and P2 is the block number inside the file. The list of sampled RDBA can be translated to a list of objects by querying the DBA_EXTENTS view for the row, where RELATIVE_FNO is equal to the sampled file number, and the range BLOCK_ID to BLOCK_ID+BLOCKS contains the sampled block number.

In one embodiment using an Oracle® database server (e.g., version 10G), it is possible to sample which objects are involved in I/O operations (e.g., in the v$session dynamic performance view). The column ROW_WAIT_OBJ# holds the information about the object id that is currently involved in an I/O operation. By sampling that column for all the sessions in v$session periodically, one can identify which objects appear in I/O operations more than others, and deduce that these objects have higher I/O wait than others.

The performance warehouse 110 may include an "objects" entity that stores the correlations between particular database objects and performance-related events (e.g., I/O waits, application lock waits, and other types of contention). For example, states such as non-buffered 110, sequential I/O created during full table scans, random I/O created when scanning indices, and other types of I/O may be shown for a database object. By tracking different I/O states, the performance management system 100 may help the user identify inefficiencies in particular parts of the access path.

In 408 a performance problem in the database server 310 is detected. Performance problems may include undesirable delays and slowness, undesirable usage of resources (e.g., storage), failures to meet user-specified Service Level Agreements (SLAs), and other suitable events. The performance problem may be detected by user analysis of performance reports provided by the performance management system 100. In one embodiment, the monitoring may occur on a routine basis through regular, scheduled analysis of the performance data 316 stored in the performance warehouse 110. Performance problems may also be detected outside of the scheduled analysis, especially in the case of extreme problems that raise alarms through Alerting Functionality 126.

The performance data 316 for the plurality of database objects 312 is analyzed to identify a problematic database object in 410. By analyzing the performance data as correlated to particular database objects, a problematic database object may be detected. The problematic database object may be related to the performance problem and may be a cause of the performance problem.

In one embodiment, automatic identification of the problematic database object may take place. Metrics such as Top Objects involved in I/O Waits and Top Locked Objects may be reported through Alerting Functionality 126. The console component 120 may provide a table of database objects that exceeded performance baselines. The console component 120 may also provide an exception report for database objects. These reports and alerts may identify one or more problematic database objects.

In one embodiment, the user may manually "drill down" through the performance data in the performance warehouse 110 to view performance information at various levels of the database server. For example, a user may be provided a plurality of ways to find and view performance data for a particular database object. From a database server instance, particular files and storage devices, particular statements (e.g., SQL statements), or a program/module/action, a user may drill down to view the lock time and I/O states for particular database object. A lock counter, and various I/O counters may be shown for a particular database object. The owner of the object may also be shown. The user may identify the cause of a performance problem in this manner.

The user may choose to take steps to remedy the performance problem (e.g., to reduce I/O waits on a particular object). In 412 the problematic database object may be tuned to improve performance of the database server 310. In one embodiment, tuning the problematic database object may include moving the problematic database object from nonvolatile storage (e.g., a hard drive) to volatile storage (e.g., RAM on the database server computer system) for improved speed of access. In one embodiment, tuning the problematic database object may include creating a new access path to the problematic database object. Creating a new access path may include creating an index, partitioning a table, rebuilding a table, etc. In another embodiment, tuning the problematic database object may including relocating it, entirely or partially, to another storage location in order to balance the I/O wait time among the database objects.

It is further noted that any of the embodiments described above may further include receiving, sending or storing instructions and/or data that implement the operations described above in conjunction with FIGS. 1-4 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    operating agent software on a server computer system, said agent software operative to collect and store performance data for a plurality of database objects on the server, wherein the performance data includes a plurality of access times;
    correlating the access times to the database objects;
    detecting a performance problem in the server computer system in response to the correlating;
    identifying a problematic database object of the database objects using the performance data for the database objects, wherein the problematic database object is related to the performance problem;
    creating a new access path to the problematic database object and either moving the problematic database object from nonvolatile storage to volatile storage for improved speed of access or moving the problematic database object from heavily loaded storage components to less loaded storage components.

2. The method of claim 1 wherein the performance data comprises an I/O wait.

3. The method of claim 1 wherein the performance data comprises an application lock wait.

4. The method of claim 1 wherein the performance data comprises a resource contention.

5. The method of claim 1, further comprising:
    correlating the collected performance data to specific database objects of the plurality of database objects.

6. A processor readable storage device having processor readable code embodied on said processor readable storage device, said processor readable code for programming one or more processors to perform a method comprising:
    collecting and storing performance data for a plurality of database objects in a database server computer system, wherein the performance data comprises a plurality of access times, wherein each of the plurality of database objects comprises an aggregation of stored data;
    correlating the access times to the database objects;
    detecting a performance problem in the database server computer system in response to the correlating;
    identifying a problematic database object of the plurality of database objects using the performance data for the plurality of database objects, wherein the problematic database object is related to the performance problem;
    creating a new access path to the problematic database object and either moving the problematic database object from nonvolatile storage to volatile storage for improved speed of access or moving the problematic database object from heavily loaded storage components to less loaded storage components.

7. The device 6, wherein the performance data comprises an I/O wait.

8. The device of claim 6, wherein the performance data comprises an application lock wait.

9. The device of claim 6, wherein the performance data comprises a resource contention.

10. The device of claim 6, wherein the program instructions are further computer-executable to implement:
   correlating the collected performance data to specific database objects of the plurality of database objects.

11. A system, comprising:
   a database server comprising a plurality of database objects, wherein each of the plurality of database objects comprises an aggregation of stored data; and a performance warehouse which stores performance data for the plurality of database objects, wherein the performance data comprises a plurality of access times;
   at least one processor; and a memory coupled to the at least one processor, wherein the memory stores program instructions that are executable by the at least one processor to:
   monitor data access times using a software agent operative to capture performance data for the database objects;
   correlate performance data to the access times;
   detect a performance problem in the database server in response to the correlation;
   identify a problematic database object of the plurality of database objects using the performance data for the plurality of database objects, wherein the problematic database object is related to the performance problem;
   create a new access path to the problematic database object and either move the problematic database object from nonvolatile storage to volatile storage for improved speed of access or move the problematic database object from heavily loaded storage components to less loaded storage components.

12. The performance management system of claim 11, wherein the performance data comprises an I/O wait.

13. The performance management system of claim 11, wherein the performance data comprises an application lock wait.

14. The performance management system of claim 11, wherein the performance data comprises a resource contention.

15. The performance management system of claim 11, wherein the performance data is correlated to specific database objects of the plurality of database objects.

16. A system for tuning database objects, the system comprising:
   means for collecting and storing performance data for a plurality of database objects in a database server computer system, wherein the performance data comprises a plurality of access times, wherein each of the plurality of database objects comprises an aggregation of stored data;
   means for correlating said database objects to said access times;
   means for detecting a performance problem in the database server computer system in response to said correlation;
   means for identifying a problematic database object of the plurality of database objects using the performance data for the plurality of database objects, wherein the problematic database object is related to the performance problem; and
   means for creating a new access path to the problematic database object and
   means for either moving the problematic database object from nonvolatile storage to volatile storage for improved speed of access or moving the problematic database object from heavily loaded storage components to less loaded storage components.

* * * * *